United States Patent
Genc et al.

(10) Patent No.: US 11,620,380 B2
(45) Date of Patent: Apr. 4, 2023

(54) METHOD FOR PREVENTING RANSOMWARE ATTACKS ON COMPUTING SYSTEMS

(71) Applicant: UNIVERSITÉ DU LUXEMBOURG, Esch-sur-Alzette (LU)

(72) Inventors: Ziya Alper Genc, Belvaux (LU); Gabriele Lenzini, Bettembourg (LU); Peter Yvain Anthony Ryan, Luxembourg (LU)

(73) Assignee: UNIVERSITÉ DU LUXEMBOURG, Esch-sur-Alzette (LU)

( * ) Notice: Subject to any disclaimer, the term of this patent is extended or adjusted under 35 U.S.C. 154(b) by 32 days.

(21) Appl. No.: 17/255,067

(22) PCT Filed: Jun. 24, 2019

(86) PCT No.: PCT/EP2019/066621
§ 371 (c)(1),
(2) Date: Dec. 22, 2020

(87) PCT Pub. No.: WO2020/002203
PCT Pub. Date: Jan. 2, 2020

(65) Prior Publication Data
US 2021/0264028 A1 Aug. 26, 2021

(30) Foreign Application Priority Data

Jun. 25, 2018 (LU) .................................. LU100844

(51) Int. Cl.
*G06F 21/55* (2013.01)
*G06F 21/56* (2013.01)
*G06F 21/00* (2013.01)

(52) U.S. Cl.
CPC .......... *G06F 21/554* (2013.01); *G06F 21/561* (2013.01); *G06F 21/566* (2013.01); *G06F 2221/034* (2013.01)

(58) Field of Classification Search
CPC .... G06F 21/554; G06F 21/561; G06F 21/566; G06F 21/50; G06F 21/51; G06F 21/52; G06F 21/54; G06F 21/56; G06F 2221/034
See application file for complete search history.

(56) References Cited

U.S. PATENT DOCUMENTS

| | | | |
|---|---|---|---|
| 2014/0140512 A1 | 5/2014 | Hadley | |
| 2014/0181974 A1* | 6/2014 | Yablokov | G06F 21/566 726/23 |

(Continued)

FOREIGN PATENT DOCUMENTS

WO    2017/125935 A1    7/2017

OTHER PUBLICATIONS

International Search Report, PCT/EP2019/066621, dated Jul. 22, 2019, 3 pages.

(Continued)

*Primary Examiner* — Edward Zee
(74) *Attorney, Agent, or Firm* — Rankin, Hill & Clark LLP

(57) ABSTRACT

A method for preventing ransomware attacks on a computing system. By controlling the access to a calling interface through which cryptographic functions, such as the random number generator, can be accessed to generate strong encryption keys the method allows to efficiently terminate cryptographic ransomware attacks on the system before they can start doing any damage. If the access to the cryptographic functions, such as the random number generator, is (Continued)

not granted, the ransomware is unable to build a strong encryption key, and it is unable to deploy its intended effect.

14 Claims, 1 Drawing Sheet

(56) References Cited

U.S. PATENT DOCUMENTS

2016/0308900 A1* 10/2016 Sadika ................ H04L 63/1441
2019/0018961 A1* 1/2019 Kostyushko .......... G06F 21/565

OTHER PUBLICATIONS

Liska, et al. "Ransomware", Nov. 30, 2016, O'Reilly, USA XP055548888, pp. 67-68.

* cited by examiner

METHOD FOR PREVENTING RANSOMWARE ATTACKS ON COMPUTING SYSTEMS

TECHNICAL FIELD

The invention lies in the field of computer science and aims at enhancing the security of computing systems such as computing devices. In particular, the invention relates to the prevention of attacks on such systems that are carried out by means of malicious pieces software, known as malware, that make use of cryptographic resources to encrypt vital data stored on said computing systems, thereby rendering the affected computing systems unusable.

BACKGROUND OF THE INVENTION

Computing systems regularly come under attack of malicious software, which, when executed by a computing system, deteriorates or even entirely prohibits the functioning of the system. It is known that malicious software, also known as computer viruses or malware, spread among computing systems via data communication networks which connect the systems to one another, such as for example via the public Internet. Other sources of infection include storage media which comprise the malware. The malware is generally designed so that it stealthily executes on the computing system and performs actions that are not allowed and not supervised by the computing system's administrator or user.

It is known to use firewall devices and firewall software for preventing malware to gain access to the computing system via a networking interface thereof. By monitoring the data traffic on a networking interface, suspicious behaviour previously observed in the context of a malware attack, may therefore be identified and blocked from doing further damage.

Cryptographic ransomware as emerged as a particular efficient type of malware, in that it is hard to detect and to stop, once a computing system has been infected. Cryptographic ransomware encrypts files and data on the infected computing system's filesystem, so that they are not usable anymore. The files can however be recoverable at the condition to know a secret, the decryption key. The authors of the malware often offer a "recovery service" to victims against payment of a substantial monetary ransom. To make sure that the encrypted filed cannot be decrypted without paying the ransom, cryptographic ransomware use strong encryption, including:
  robust and known encryption algorithms, such as the Advanced Encryption Standard, AES, standardized by the National Institute of Standards and Technology of the United States of America, NIST;
  strong encryption keys, featuring an important length and a high degree of randomness.

A strong encryption key makes it practically impossible to decrypt the encrypted files. Established theoretical results proves that guessing or determining the key without any prior knowledge nowadays would take for any computing systems, present and future, an enormous amount of time far beyond one's lifetime Ransomware are particularly dangerous both technically and psychologically. They attack large enterprises and individuals alike, thereby disrupting import and services and workflows, while eroding people's trust and sense of security in the communication technologies. Indeed, some known malware threaten to increase the ransom fee or to irrevocable destroy the file if the payment is not done, and some do not decrypt the files even though the ransom has been paid up. An economical plague ensues: the total costs due to cryptographic ransomware attacks has by some estimates exceed worth of 5 billion US Dollars in the year 2017, and it has been predicted to cost up to 6 trillion US Dollars by 2021.

Known solutions to the threat of cryptographic ransomware rely on the following three principles, each of which presents distinct disadvantages, and none of which has been capable of reliable preventing all known ransomware attacks.
1. The first known principle relies on keeping back-ups of files and data on a secure storage, so that after a ransomware attack, it is possible to restore a non-encrypted version of the affected files.
   However, most users and some administrators do not keep back-ups or do not check the sanity of their backup copies regularly, so that this solution is both expensive, as large amounts of storage are required, and ineffective. According to recent surveys, only about 42% of affected victims were able to recover all their data after a ransomware attack.
2. The second known principle relies on monitoring activities on the computing system, in search for suspicious ones. Once suspicious activities are detected, the corresponding processes are isolated or stopped to prevent further harm.
   Monitoring for suspicious activities is a resource expensive task and intense run-time monitoring consumes considerable computational resources. This may slow down a computer's performance for day-to-day working tasks. Moreover, since the models of ransomware on which such solutions rely are not perfect, they need to be regularly refined and updated in order to adapt to the evolution of the ransomware, which may change their behavioural patterns in time.
3. The third known principle relies on logging any encryption keys used in the computing systems. After an attack, the corresponding logs are searched in order to find the encryption key used by the ransomware, so that the affected files may be decrypted.
   The key-logging approach has several drawbacks:
      it undermines the security of the system of ephemeral cryptographic keys that are used by hones protocols, e.g., Transport Layer Security, TLS, or Secure Shell, SSH. Their keys, once logged, may be stolen by malware from the log;
      it is an inefficient strategy. Finding the keys used by ransomware among the heap of keys stored is done by trial-and-error, which requires a large amount of time. Honest software, such as remote cloud-based storage, may indeed use thousands of encryption keys on a single device. To that, one has to add the time needed to decrypt the files once the appropriate key has been determined. This time may amount to several hours on a personal computer relying on average available computing resources;
      the approach may still fail is the ransomware uses third-party libraries or functions that escape the logging strategy;
      some known ransomware reboots the computing system as soon as the encryption key has been constructed. Upon reboot of the computing system, the file encryption process is immediately launched by the ransomware, so that the access to the key log is effectively prohibited.

Technical Problem to be Solved

It is an objective of the invention to present a method, which overcomes at least some of the disadvantages of the prior art. In particular, it is an objective of the invention to present a method for improved prevention of cryptographic ransomware to encrypt files on computing systems.

SUMMARY OF THE INVENTION

According to a first aspect of the invention, a method for preventing ransomware attacks on a computing system is provided. The computing system has access to computing resources including cryptographic resources, which comprise random number or pseudo-random number generation means, and which are accessible through calling interface means. The method comprises the following steps:
a) providing predetermined requirements describing a permissible call through said calling interface means in a memory element;
b) using monitoring means, monitoring the use of said calling interface means, comprising the obtention of data identifying a call;
c) blocking said call to said cryptographic resources, unless the data identifying said call complies with said predetermined requirements.

According to an aspect of the invention, a method for preventing ransomware attacks on a computing system is provided. The computing system has access to computing resources including a source of randomness, which comprises random number or pseudo-random number generation means, and which are accessible through calling interface means, The method is remarkable in that it comprises the following steps:
a) providing predetermined requirements describing a permissible call to said source of randomness comprising random number or pseudo-random number generation means through said calling interface means in a memory element;
b) using monitoring means, monitoring the use of said calling interface means, comprising the obtention of data identifying a call;
c) blocking said call to said source of randomness, unless the data identifying said call complies with said predetermined requirements.

Preferably, the data identifying said call may comprise data identifying the calling process. The data identifying the calling process may preferably include a process ID that identifies the process within the computing system's operating system. The data identifying the calling process may preferably comprise a higher-level description of the software program executed through said process.

The predetermined requirements may preferably comprise data identifying at least one calling process that is allowed to access said cryptographic means or source of randomness. The call may preferably be blocked unless the data identifying the calling process is comprised in the data identifying at least one allowed calling process.

The cryptographic means or source of randomness may preferably comprise a cryptographically secure random number generator.

Preferably, the calling interface means comprise an application programming interface providing access to said cryptographic means or source of randomness.

Blocking the call may preferably comprise terminating the corresponding calling process.

Preferably, the monitoring means and/or calling interface means may be part of the computing system's operating system. As such they may preferably be implemented by a computer program stored in a memory element to which a processing unit of the computing system has read/write access. The computer program may comprise instructions that are executable by the processing unit and which, when executed, provide the monitoring/interface function as described.

The cryptographic resources or source of randomness may further comprise a source of entropy.

According to a further aspect of the invention, a computer program is provided. The computer program comprises computer readable code means, which when run on a computer, cause the computer to carry out the method according to aspects of the invention.

According to another aspect of the invention a computer program product is provided. The computer program product comprises a computer-readable medium on which the computer program according to aspects of the invention is stored.

According to a final aspect of the invention, a computer configured for carrying out the method according to aspects of the invention is provided. The computer or computing device comprises a processing unit and at least one memory element to which the processing unit/processor has read/write access, for example through a data bus connection. The memory element stores computer readable instructions which, when read and executed by the processing unit, causes the computer to run the method in accordance with aspects of the invention. The computer further comprises cryptographic resources or a source of randomness, which are accessible through a calling interface, and which is preferably provided by the operating system of the computer, which is executed by said processing unit.

By using the method as proposed by aspects of the invention, it becomes possible to stop an attack on a computing system by cryptographic ransomware before the ransomware starts to compromise and encrypt any files. The method also stops ransomware programs that, before encrypting files, reboot the infected system: in this case the ransomware are stopped before they cause a reboot. The method may work as a process in the computing system's Operating System, it may be an independent software solution, or integrated with known anti-malware software solutions. In contrast to known solutions to ransomware threats, the proposed strategy is not based on back-ups, nor on observing, analysing or recognising a complex evolving behaviour within the computing system. Nor does the proposed strategy store information for a later recovery/decryption attempt of already encrypted files. Rather, the proposed strategy relies on intercepting requests addressed to cryptographic resources that are required to build a strong encryption key, as used among others by cryptographic ransomware. The strategy checks whether a requester is legitimate to access the cryptographic resources and terminates any illegitimate requesters. By adopting this approach, the proposed strategy allows to stop an attack before the encryption key is produced, so that it obliviates any drawbacks caused by key-logging approaches. Importantly, no sensitive information about honest processes needs to be stored, which may compromise their security. The proposed strategy only requires little CPU power and only requires a small memory footprint as it does not rely on large amounts of storage, as used for example in back-up-based strategies. Furthermore, by only blocking requesters that have not been explicitly cleared, honest protocols and software may still use the cryptographic resources or sources of randomness of the computing system unhindered. Compared to solutions which monitor application behaviour and which require updates on the heuristic methods whenever new ransomware is discovered, the proposed strategy is stable in time, as the conditions that determine allowable requesters may be updated easily. A Microsoft Windows 7™ based implementation of the method according to aspects of the present invention using a simple white list as a set of predetermined conditions for authorizing access to the computing system's cryptographic resources (i.e., a cryptographically secure pseudo-random number generator) has been tested on several computing systems against 307 real ransomware. The method was successful in blocking 94% of the attempted attacks, including new generation ransomware like the NotPetya malware, which currently overcomes all known anti-ransomware solutions.

BRIEF DESCRIPTION OF THE DRAWINGS

Several embodiments of the present invention are illustrated by way of figures, which do not limit the scope of the invention, wherein.

DETAILED DESCRIPTION OF THE INVENTION

Figure 1:
FIG. 1 illustrates the main steps of a method in accordance with a preferred embodiment of the invention.

This section describes the invention in further detail based on preferred embodiments and on the figures.

It should be noted that features described for a specific embodiment described herein may be combined with the features of other embodiments unless the contrary is explicitly mentioned. Features commonly known in the art will not be explicitly mentioned for the sake of focusing on the features that are specific to the invention. For example, a computing system is evidently powered by an electric supply, even though such supply is not explicitly referenced on the figures nor referred to in the description. Similarly, an Operating System provides a plethora of functions and provides APIs to numerous components of a computing system (networking interface, display, data bus, etc. . . . ), even though these aspects are not explicitly referred to in the description.

Cryptographic ransomware needs strong encryption keys in order to implement strong encryption. In order to generate such keys, the cryptographic ransomware needs access to random numbers. The safest way for a cryptographic ransomware to get random numbers is to ask for them through the Operating System of the computing system it has infected.

As randomness is also necessary and required for other security tasks, such as secure data communications (e.g., in electronic banking), all modern computer Operating systems have dedicated high entropy functions for this purpose, which are known as cryptographically secure pseudo-random number generators. The mathematics and algorithms on which such pseudo-random number generators rely have been extensively studied and published, and they are well known in the art. Their details will therefore not be explained in the context of the present invention. Operating Systems also provide other lower entropy sources that ransomware may use to extract entropy in order to generate encryption keys. These include hard disk sensors, Central Processing Unit, CPU, sensors, voltage sensors, keyboard, mouse/pointer devices and system clocks. But relying on these functions is likely to lead to weaker encryption keys. All sources of randomness available to the computing system are referred to as cryptographic resources.

In accordance with embodiments of the invention, an access control mechanism is provided. The access control mechanism enforces access requests to the cryptographic resources and blocks or terminates unauthorized attempts. The cryptographic resources, including cryptographically secure pseud-random number generators, are considered to be security-critical resources. On the Microsoft Windows™ Operating System for example, the Application Programming Interface, API, calls that are monitored by the access control mechanism in accordance with aspects of the invention, includes the CryptGenRandom, BCryptGenRandom or RtlGenRandom calls. Further, a certification mechanism is used to certify applications, and to authorize them to access the cryptographic resources subject to certain conditions.

When any process running on the computing device requests access to the cryptographic resources, the proposed method intercepts the process's identity, PID, and checks whether the process is authorized to access the cryptographic resources in the current setting. If the check fails, the process is terminated. A ransomware will fail the check and the Operating System will therefore not provide the ransomware with the random number it requires to build an encryption key.

FIG. 1 illustrates the main steps of a method in accordance with a preferred embodiment of the invention. The method aims at preventing ransomware attacks on a computing system or, equivalently, on a computer. The computer runs an Operating System which allows the execution of software programs through the use of a software process. The execution of a software program is enabled by reading corresponding software instructions from a memory element of the computer, and executing these instructions by means of a processor, which orchestrates the execution using other components of the computer's hardware and/or Operating System. The computer has access to computing resources including cryptographic resources or a source of randomness, which comprise a random number or pseudo-random number generator. The cryptographic resources/source of randomness may be physically remote from the computer and accessible through a secured data communication channel. Advantageously however, the cryptographic resources are physically collocated with the computer. The cryptographic resources comprise for example a cryptographic chip which provides a data processor that implements cryptographic routines including generating cryptographic keys and/or encrypting and decrypting data. The cryptographic resources/source of randomness are accessible through a calling interface, such as an API function call, which is provided by means of a function embedded in the computer's Operating System. As illustrated, the method comprising the following steps:

a) providing predetermined requirements describing a permissible call to the source of randomness or entropy through said calling interface means in a memory element. The predetermined requirements comprise for example a list identifying certified and authorized software processes.

b) using monitoring means, monitoring the use of said calling interface means, comprising the obtention of data identifying a call. The monitoring means provide an implementation of the access control mechanism outlined here above.

c) blocking said call to said cryptographic random number or pseudo-random number generation means, unless the data identifying said call complies with said predetermined requirements. If the calling process has not been previously certified or authorized for accessing the corresponding cryptographic resources, it will not be on the list, and it is terminated.

Figure 2:
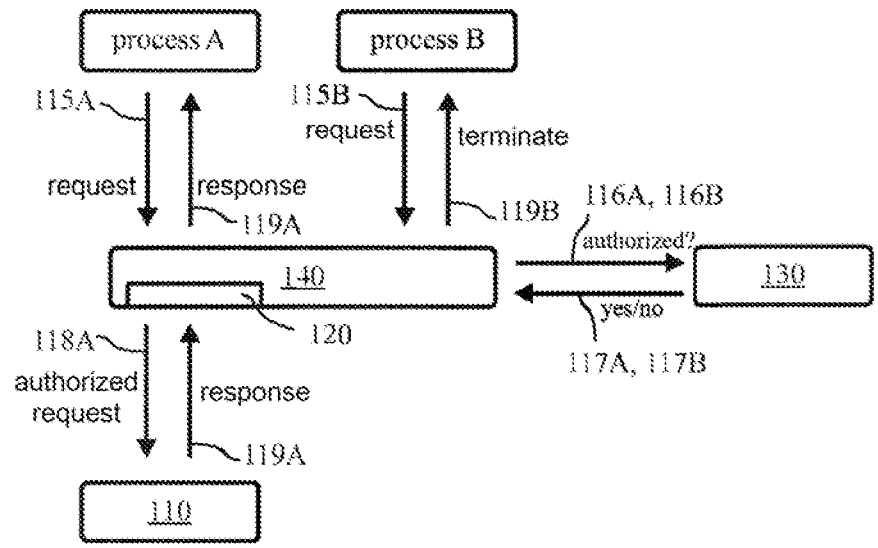
FIG. 2 provides a workflow diagram illustrating a method in accordance with a preferred embodiment of the invention.

FIG. 2 provides a workflow view of the method in accordance with a preferred embodiment of the invention. Two processes A and B are executed in the Operating System of a computing device and each issue a request 115A, 115B to access the computing device's cryptographic resources 110. The cryptographic resources 110 can only be accessed through a call to the corresponding API 120. This call is intercepted by the monitoring means 140. The APIs can be intercepted/blocked and their parameters as well as their return values can be intercepted and/or modified easily. The corresponding actions are provided for by all modern Operating Systems. For instance, in Microsoft Windows™ systems, intercepting the APIs can be achieved through several techniques including Dynamic Link Library, DLL, injection, Import Address Table, IAT, hooking, or kernel mode hooking. The method may also be implemented in the Operating System's kernel, so that the API could be bypassed entirely. In accordance with a preferred but non-limiting embodiment of the invention, a DLL injection technique is used, which uses the Detours library of Microsoft™ Research for that purpose. Intercepting a call to the cryptographic resources is handled by a DLL module, which is loaded into a target process on the computing system. This for example done using the AppInit DLLs technique. Once loaded, the DLL hooks CryptGenRandom function, that is, whenever CryptGenRandom is called by a process, the corresponding program flow is routed to the monitoring means 140. The monitoring means call GetModuleFileName to obtain the full path to the module of the caller process, which can point to a DLL or to an executable. The SHA256 digest of the binary file of the module is computed and compared against the predetermined conditions 130, such as a whitelist. If the result is positive, the monitoring means 140 grant access to the cryptographic resources 110 through API 120: CryptGenRandom is called with the intercepted parameters and the result is returned to the caller process. If access is not granted, ExitProcess is called instead, which causes the caller process to end.

Upon interception of the call or request 115A issued by process A, the monitoring means 140 obtain the identity of the caller process. This information is available within the Operating System. Next, the so obtained identity 116A is checked against a set of predetermined conditions 130, which includes for example a list of process identities which are authorized to access the cryptographic resources/source of randomness 110. The set or predetermined conditions 130 implements a system policy, and may advantageously be kept as simple as possible: verify whether the process has authorization to access the cryptographic resources 110 in the current conditions. Deciding the criteria that define whether an application is eligible to get authorization and delivering an authorization is preferably implemented as an offline process, which may be updated periodically. This can be implemented in various ways. For example, the computer system's administrator, or a user may whitelist an application. The process may also be more complex in that an application is only authorized after thorough checks. Alternatively, applications that have been digitally signed by a trusted authority may be allowed the cryptographic resources. In the illustrated scenario, process 116A is whitelisted and satisfies the predetermined conditions, as it corresponds to a process implementing an SSH communication protocol, so that the corresponding call is cleared 117A. Upon the positive clearing of the initial request from process A, the request is forwarded 118A to the cryptographic resources 110, which in reply outputs the requested random number 119A, which is forwarded to process A.

Upon interception of the call or request 115B issued by process B, the monitoring means 140 obtain the identity of the caller process. This information is available within the Operating System. Next, the so obtained identity 116B is checked against a set of predetermined conditions 130, which includes for example a list of process identities which are authorized to access the cryptographic resources/source of randomness 110. In the illustrated scenario, process 116B is not listed as it corresponds to a cryptographic malware. It does not satisfy the predetermined conditions, so that the corresponding call is not cleared 117B. Upon the negative clearing of the initial request from process B, the request to the cryptographic resources 110 is not granted, and a termination signal 119B is transmitted to process B.

Figure 3:
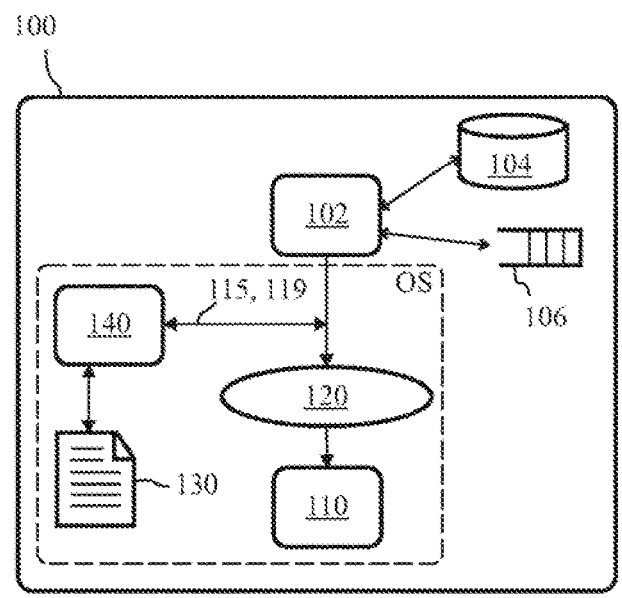
FIG. 3 is a schematic illustration of a device in accordance with a preferred embodiment of the invention.

FIG. 3 provides a schematic illustration of a computing system 100 for implementing the method as described through several embodiments. The computing system 100 comprises a central processing unit, CPU, 102 that is functionally connected via a data bus to have read/write access to volatile 106 and/or persistent 104 memory elements. These may include Hard Disk Drives, HDD, Solid State Drives, SSD, Random Access Memory, RAM, chips, removable drives or networked storage that is accessible through a non-illustrated networking interface and through a corresponding data communication channel. The CPU executes an Operating System, OS, within which it executes several programs in the form of processes. The CPU 102 is also functionally connected to cryptographic resources 110 including a cryptographically secure pseudo-random number generator 110. The generator 110 may be implemented as a dedicated hardware chip, or it may be a software routine executed by the CPU itself, as shown in FIG. 3. Calls to the generator 110 are handled using a calling interface 120. Any call 115 by any process executed by the CPU is intercepted by a monitoring means 140, which is implemented as a software routine run by the CPU itself. A set of predetermined conditions 130, stored for example in one of the memory elements 104, 106, and retrieved therefrom, is consulted to check whether an intercepted call is authorized to access the pseudo-random number generator 110 or not. The corresponding call 115 is only forwarded to the pseudo-random number generator 110 if satisfies the predetermined conditions 130. Otherwise, the calling process is terminated. While the example of FIG. 3 shows the method as being implemented within the Operating System, it may as well be implemented as a standalone software program executed by the CPU within the Operating System. In such case, the instructions corresponding to the software program are read from the memory element 104, 106 and configure the CPU in such a way as to implement the method in accordance with aspects of the invention.

Based on the description that has been given and the accompanying figures, a person skilled in the art will be able to write a computer program implementing the functionalities described herein without undue burden and without requiring any degree of additional inventiveness.

It should be understood that the detailed description of specific preferred embodiments is given by way of illustration only, since various changes and modifications within the scope of the invention will be apparent to the person skilled in the art. The scope of protection is defined by the following set of claims.

The invention claimed is:

1. A computer-implemented method for preventing ransomware attacks on a computing system, the computing system having access to computing resources including a source of randomness, which comprises random number or pseudo-random number generation means, and which are accessible through a calling interface means, the computer-implemented method comprising the following steps:
   providing predetermined requirements describing a permissible call to said source of randomness comprising random number or pseudo-random number generation means through said calling interface means in a memory element;
   monitoring a usage of said calling interface means using a monitoring means, wherein monitoring the usage includes obtention of data identifying a call to said source of randomness, wherein the data identifying said call comprises data identifying a calling process; and
   determining if the data identifying the call complies with the predetermined requirements and blocking said call to said source of randomness when it is determined that the data identifying said call does not comply with said predetermined requirements, wherein the predetermined requirements comprise data identifying at least one calling process that is allowed to access said source of randomness, and wherein said call is blocked unless the data identifying the calling process is comprised in the data identifying at least one allowed calling process.

2. The computer-implemented method according to claim 1, wherein said source of randomness comprises a cryptographically secure random number generator.

3. The computer-implemented method according to claim 1, wherein said calling interface means comprise an application programming interface providing access to said source of randomness.

4. The computer-implemented method according to claim 1, wherein blocking said call comprises terminating a corresponding calling process.

5. The computer-implemented method according to claim 1, wherein said monitoring means are part of the computing system's operating system.

6. The computer-implemented method, according to claim wherein the source of randomness comprises a source of entropy.

7. A system for preventing ransomware attacks on a computing system, the computing system having access to computing resources including a source of randomness, which comprises random number or pseudo-random number generation means, and which are accessible through a calling interface means, the system comprises a memory storing instructions when executed by a processor cause the processor to:
   provide predetermined requirements describing a permissible call to the source of randomness comprising random number or pseudo-random number generation means through the calling interface means in a memory element;
   monitor a usage of the calling interface means using a monitoring means, wherein monitoring the usage includes obtention of data identifying a call to said source of randomness, wherein the data identifying the call comprises data identifying a calling process; and
   determine if the data identifying the call complies with the predetermined requirements and blocking the call to the source of randomness when it is determined that the data identifying the call does not comply with the predetermined requirements, wherein the redetermined requirements comprise data identifying at least one calling process that is allowed to access the source of randomness, and wherein the call is blocked unless the data identifying the calling process is comprised in the data identifying at least one allowed calling process.

8. The system of claim 6, wherein the source of randomness comprises a cryptographically secure random number generator.

9. The system of claim 7, wherein the calling interface means comprise an application programming interface providing access to the source of randomness.

10. The system of claim 7, wherein blocking the call comprises terminating a corresponding calling process.

11. The system of claim 6, wherein the monitoring means are part of the computing system's operating system.

12. The system of claim 6, wherein the source of randomness comprises a source of entropy.

13. A non-transitory computer readable storage medium storing instructions that when executed by a computer, which includes a processor perform a method, the method comprising:
   providing predetermined requirements describing a permissible call to a source of randomness of a computing system that includes a random number or pseudo-random number generation means through a calling interface means;
   monitoring a usage of the calling interface means using a monitoring means, wherein monitoring the usage includes obtention of data identifying a call to said source of randomness, wherein the data identifying the call comprises data identifying a calling process; and
   determining if the data identifying the call complies with the predetermined requirements and blocking the call to the source of randomness when it is determined that the data identifying the call does not comply with the predetermined requirements, wherein the predetermined requirements comprise data identifying at least one calling process that is allowed to access the source of randomness, wherein the call is blocked unless the data identifying the calling process is comprised in the data identifying at least one allowed calling process.

14. The non-transitory computer readable storage medium of claim 13, wherein blocking the call comprises terminating a corresponding calling process.

* * * * *